(12) United States Patent
Vengerov (10) Patent No.: US 10,496,511 B2
(45) Date of Patent: Dec. 3, 2019

(54) FREQUENT ITEMS DETECTION IN DATA SETS

(71) Applicant: Oracle International Corporation, Redwood Shores, CA (US)

(72) Inventor: David Vengerov, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 285 days.

(21) Appl. No.: 15/275,711

(22) Filed: Sep. 26, 2016

(65) Prior Publication Data

US 2018/0089275 A1   Mar. 29, 2018

(51) Int. Cl.
  *G06F 11/30* (2006.01)
  *G06F 16/23* (2019.01)
  *G06Q 30/02* (2012.01)

(52) U.S. Cl.
  CPC ...... *G06F 11/3075* (2013.01); *G06F 16/2358* (2019.01); *G06Q 30/0201* (2013.01)

(58) Field of Classification Search
  CPC ........... G06F 11/3075; G06F 17/30368; G06Q 30/0201
  See application file for complete search history.

(56) References Cited

U.S. PATENT DOCUMENTS

| 2005/0120006 A1* | 6/2005 | Nye | G06F 17/30705 |
| 2012/0159336 A1* | 6/2012 | Norwood | G06F 3/0482 715/733 |
| 2016/0085446 A1* | 3/2016 | Kumabe | G06F 3/0649 711/146 |
| 2017/0353477 A1* | 12/2017 | Faigon | H04L 63/1416 |

OTHER PUBLICATIONS

A. Metwally et al., Efficient computation of Frequent and Top-k Elements in Data Streams, University of California, 2005.
N. Manerikar, "Frequent Items in Streaming Data: An Experimental Evaluation of the State-of-the-Art", University of Trento, Italy, 2009.
G. Manku et al., "Approximate Frequency Counts over Data Streams", Stanford University, 2002.
N. Homem et al., "Finding top-k elements in data streams", Instituto Superior Tecnico, Lisboa, Portugal, Aug. 15, 2010.
E. Demaine et al., "Frequency Estimation of Internet Packet Streams with Limited Space", preliminary version of this paper appears in the Proceedings of the 10th Annual European Symposium on Algorithms, 2002.

(Continued)

*Primary Examiner* — Matthew J Ellis
(74) *Attorney, Agent, or Firm* — Potomac Law Group, PLLC (57) ABSTRACT

A system is provided that generates a list of most common items and respective item frequencies from a data set that includes a plurality of items. The system creates a first list of items from the data set and monitors an estimate count for each item in the first list, where the first list is sorted by the estimate count. The system further transfers items that exceed a threshold hit count from the first list to a second list. The system further monitors a hit count for the items in the second list, where the items in the second list are sorted by the hit count. The system further transfers the items that are displaced from the second list back to the first list.

20 Claims, 6 Drawing Sheets

(56) References Cited

OTHER PUBLICATIONS

S. Das et al., "Thread Cooperation in Multicore Architectures for Frequency Counting over Multiple Data Streams", Department of Computer Science, University of California, Santa Barbara, UCSB Computer Science Technical Report Apr. 2009, 2009.
G. Cormode, "Finding Frequent Items in Data Streams", VLDB '08, Aug. 24-30, 2008, Auckland, New Zealand Copyright 2008 VLDB Endowment, ACM 000-0-00000-000-0/00/00.

* cited by examiner

Minimum hit count value ($h_{min}$)

508 — When a key is upgraded from the first list section, always replace the last key with hit count = $h_{min}$

| 1 | 1 | 1 | 3 | 6  | 11 | 11 | 15 | 25 | 48 | 86 | ← 504 hit count |
| 2 | 3 | 6 | 9 | 0  | 7  | 21 | 81 | 12 | 43 | 99 | 28 | ← 502 keys |

$h_{min} = 1$

FREQUENT ITEMS DETECTION IN DATA SETS

FIELD

One embodiment is directed generally to a database system, and in particular, to detecting the most frequent items in data sets and accurately estimating the respective item frequencies.

BACKGROUND INFORMATION

Generally, a data set includes a plurality of data records or data items, and each data record or item includes one or more fields of information and is uniquely identified by a key parameter. Depending on the nature and distribution of a particular data set, different items or keys may appear with different frequencies through the data set. The problem of detecting the most frequent items in large data sets and providing accurate frequency estimates for those items arises in many areas. For example, (i) Internet providers need to know the most frequent destinations in order to manage traffic and service quality; (ii) Social network companies need to find the most frequent interactions among the users in order to extract information about connections and relations between individuals; (iii) Retail companies need to know the most common products purchased by each customer in order to better classify the customer and design appropriate marketing campaigns; and (iv) Database engines can optimize query plans depending on the degree of skew in the underlying data and can give separate treatment to the most frequent items. Additionally an increasing number of businesses find it useful to monitor the most frequent topics in news streams or social media so as to adjust their business decisions based on these topics. In order to be practical, any algorithm that tackles this problem has to perform its computations using limited memory, usually orders of magnitude less than the size of the data set. Another key practical requirement is performing all computations in one pass— without these features, an algorithm for detecting most frequent items and estimating the associated item frequencies would not be useful for very large data sets or data streams.

SUMMARY

One embodiment is directed to a system that generate a list of most common items and respective item frequencies from a data set that includes a plurality of items. The system creates a first list of items from the data set and monitors an estimate count for each item in the first list, where the first list is sorted by the estimate count. The system further transfers items that exceed a threshold hit count from the first list to a second list. The system further monitors a hit count for the items in the second list, where the items in the second list are sorted by the hit count. The system further transfers the items that are displaced from the second list back to the first list.

DETAILED DESCRIPTION

According to one embodiment of the invention, a one-pass frequent item extraction system for accurately estimating frequency of the most common items in a data set is disclosed. Generally, due to the limited available memory, only a limited number of distinct items in a large data set may be stored for monitoring and item frequency tracking. Accordingly, inclusion of a new item to the frequency monitoring list requires eviction of an item (having minimum estimated frequency/count value), from the bottom of monitoring list. However, for a data set having a certain item (key) frequency distribution, such as heavy-tailed frequency distribution, unwanted items may be observed frequently enough to displace some of the most frequent items from a monitoring list.

Embodiments protect detected frequent keys from being displaced from the limited memory by a large inflow of newly observed items or ("keys") that are unlikely to be hit again. Embodiments accomplish this by adding a second layer of protection based on the number of times an item is observed after being stored in the monitoring list. Candidate items are promoted based on their hit count values to a more protected rank in the memory such that promoted items are protected from displacement by an inflow of new items and can only be displaced by items already in the monitoring list based on observed hit count values (number of observations after inclusion in the frequency monitoring list). The second layer of protection is afforded to truly frequent items through implementation of a hit count monitoring list which acts as a special protected list. As a result, the disclosed frequency or ("count") estimation embodiment improves accuracy of the decision making regarding which items to keep and continue to monitor and which items to discard in order to make room for a new entry by utilizing a two-list framework for accurate detection of frequent items in a large data set.

The general approach for exact detection of the most common items and the associated frequencies in a data set would be to keep track of every distinct item observed by, for example, incrementing an item count for each occurrence of the item and doing this for every distinct item encountered in the data set. However, in the case of large data sets, storing an entry in the memory for each distinct key or item would require a substantial memory resource and therefore would not be feasible. However, if the goal is identification and frequency estimation of the top "k" most frequent items in a data set that includes millions of distinct items, then information on only k items needs to be stored and thus there is no need to store information on millions of other keys.

Therefore one approach to get around the limited memory constraint would be to only track frequency information for a limited number of items based on the requirements of the application. The challenge is to represent, as accurately as possible, the top "k" most frequent items along with their frequencies, while tracking a fraction of the number of distinct keys in the data set. For example, given an available memory for at most 1000 keys, identifying and estimating the frequency of, for example, the top 100 most frequent items in a data set including many millions of keys would involve storing information on 1000 keys and from those selecting the top 100 most frequent items. Accomplishing this requires a smart algorithm capable of making optimal decisions on which of the distinct items observed up to a point needs to be included in the list of most frequent items and stored in the limited memory. A challenge in detection of frequent items and item frequencies is to do it with limited memory space and in one pass, such that a decision on which key to store and which key to discard is made and applied to every new key observed as the data is passing through until a single pass is made through the entire data set. Once the single pass through the data set is complete, a list of distinct items (keys) and the respective frequencies stored would represent the generated list of the most frequent items.

One of the most well-known algorithms for performing a limited-memory one-pass estimation of frequency for the most frequent items in a data set is the Space-Saving ("SS") algorithm. In the SS algorithm, the underlying idea is to monitor only a pre-defined number of, for example, "m" elements or keys and their associated counters in a data set. The SS algorithm stores the estimated frequency of each monitored key in a hash map with the maximum size m. If key i is observed and it has a corresponding entry in the hash map, then its frequency estimate $f_i$ is incremented. Otherwise, an entry is added to the hash map. When the number of entries in the hash map exceeds m, the entry corresponding to the item with the smallest estimated frequency $f_{min}$ is removed. When the whole data set with N data points is processed, the maximum possible error $\Delta_i$ in the frequency estimate for an item i satisfies $0 \leq \Delta_i \leq \lfloor N/m \rfloor$.

The known Filtered Space-Saving ("FSS") algorithm improves the accuracy of the SS algorithm while still using the same amount of space. Instead of always adding a new entry to the hash map when an item is observed for which no entry exists, a special procedure is followed. This special procedure includes first hashing the item's key, uniformly, into a "hash array" H. If the value H[k] in the cell k to which the item is hashed is smaller than $f_{min}-1$, then H[k] is increased by 1 and no further action is taken. Otherwise, a new entry is created for the item, its estimated frequency $f_i$ is set to H[k]+1 and its maximum error $\Delta_i$ is set to H[k]. When an entry for a certain item is removed from the hash map, the H[k] value of the cell k to which that item is hashed is set to the estimated frequency of that item, so that H[k] will still represent the maximum overestimation error for any item that hashes to cell k.

As a rough guideline, the hash array H is allocated as much space as occupied by all entries in the hash map. If more space is allocated to H at the expense of the hash map, then fewer collisions will occur in H and thus the frequency estimates will become more accurate for those keys that never got removed from the hash map. However, fewer entries will be stored in the hash map, and also fewer of them will be able to stay in the hash map without ever being removed. Therefore if the objective is getting the most accurate frequency estimates for the first few most frequent keys, more than half of the space should be allocated to the hash array H. However, if the objective is getting a list of as many as possible most frequent keys, then less than half of the space should be allocated to H.

Assuming that FSS stores $$\frac{m}{2}$$

entries in its hash map, then it has the following accuracy guarantee: $0 \leq \Delta_i \leq H[k] \leq f_{min} \leq \lfloor 2 N/m \rfloor$. While the worst-case behavior of FSS is worse than that of SS (because FSS uses only half as many entries in the hash map), the addition of the H[k] term to the inequality implies that most of the time the frequency estimates of FSS will be much more accurate than those of SS. Indeed, if no entries for items that get hashed to cell k have yet been added to the hash map, then H[k] represents the total frequency of all such items that were observed so far. When an item is observed and is hashed to cell k, it is likely to be the most frequent item out of those that get hashed to cell k, and thus its real frequency is likely to be only slightly smaller than H[k]. Therefore, when a new item is added to the hash map and its estimated frequency is set to H[k]+1, its final frequency error is likely to be small.

It is noted that the SS and FSS algorithms do not work very well for heavy-tailed data distributions that are not very skewed. For such distributions, unwanted (rare) items are observed frequently enough so as to keep displacing from the limited memory (hash map) allocated to the algorithm many of the most frequent items that should be retained. Therefore, embodiments augment and improve the FSS algorithm in such a way so as to prevent such a displacement of entries for the frequent items by keeping information about the frequently observed items in a special protected list, which prevents that information from being displaced from memory when long sequences of new items are observed. In accordance to one embodiment of the invention this is accomplished by splitting the hash map entries into two conceptual lists, one for "new" items sorted by estimated frequency or ("estimate count") and one for "old" items sorted by observed hits i.e., (hit count).

Figure 1:
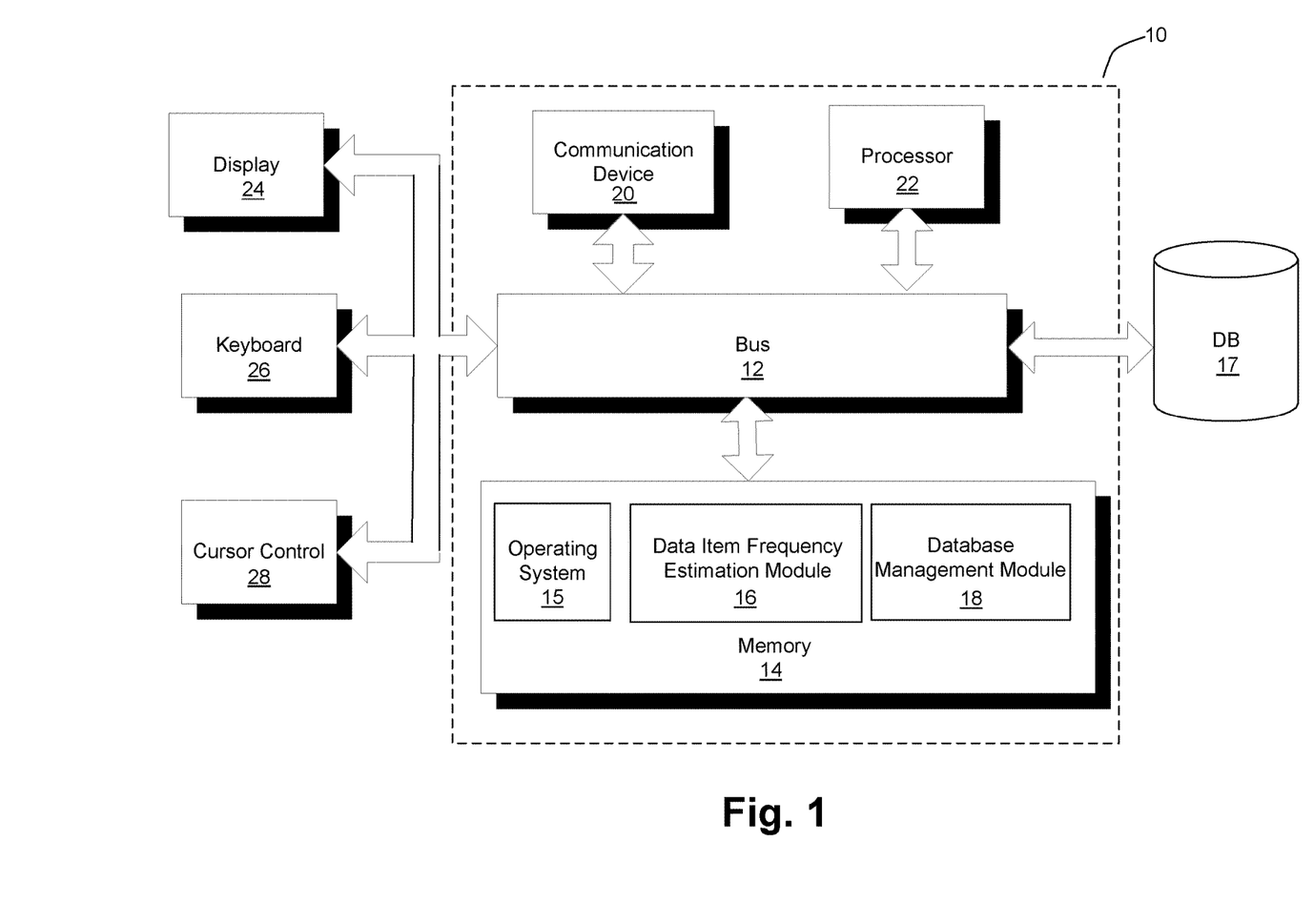
FIG. 1 is a block diagram of a computer server/system that includes a Data Item Frequency Estimation module for identifying and providing frequency information on the top most frequent data set items, in accordance with an embodiment of the present invention.

FIG. 1 is a block diagram of a computer server/system (i.e., system 10) in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a database management system, system 10 may be a server that in general has no need for a display 24 or one or more other components shown in FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a Data Item Frequency Estimation module 16 for providing a list of top most frequent items in a data set along with an accurate estimation of their respective frequencies, and all other functionality disclosed herein. System 10 can be part of a larger system, such as added functionality to the Oracle Database Optimizer from Oracle Corp., or any database management system. Therefore, system 10 can include one or more additional functional modules such as Database Management Module 18. A database 17 is coupled to bus 12 to provide centralized storage for Data Item Frequency Estimation Module 16 and additional functional modules such as Database Management Module 18.

In one embodiment, Data Item Frequency Estimation Module 16 receives a data set, such as, for example, a data stream that includes a plurality of distinct data items, and may implement a Filtered Space Saving Two List ("FSS2L") algorithm that may be used for detecting the most frequent values in a data stream. This algorithm makes a single pass over the data (performing order one operations for each tuple). The FSS2L algorithm creates a list of suggested most frequent values, and for each value gives its estimated frequency and the maximum estimation error. In one embodiment, the values that appear in the candidate lists may have the maximum percentage frequency estimation error less than a certain threshold are considered to be "frequent values" or number of. This may also be performed for highly skewed data distributions.

Figure 2:
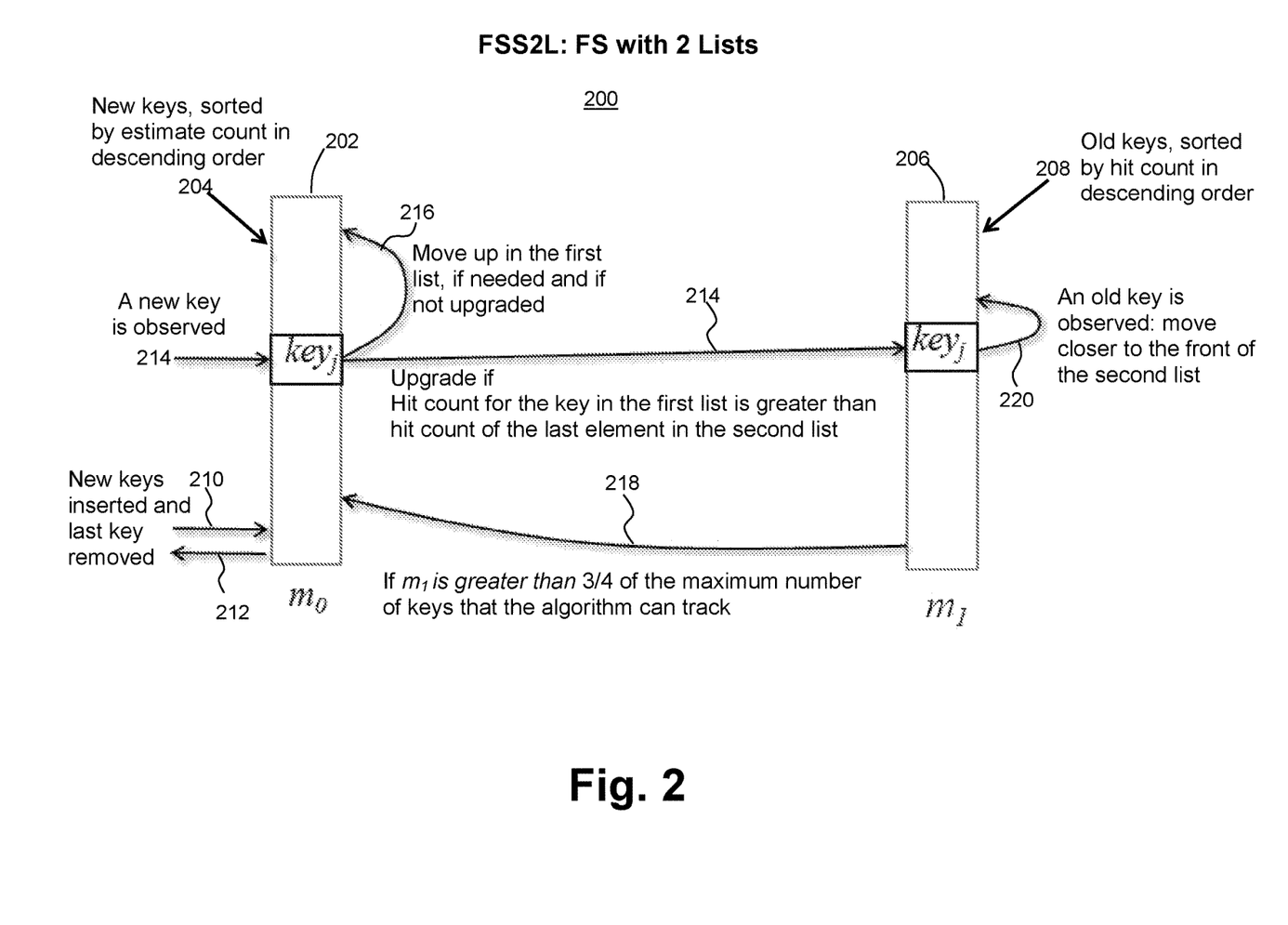
FIG. 2 is a schematic diagram illustrating data structures and operational data flow for accurate determination of the top most frequent items and item frequencies, in accordance with embodiments of the present invention.

The operation of the FSS2L framework, in accordance to one embodiment of the present invention, is illustrated in FIG. 2. An operational diagram 200 utilizes a first list (unprotected List) 202 for storing "new" keys 204 sorted by estimate count value (in descending order) and a second list (protected list) 206 for storing "old" keys 208 sorted by hit count value (in descending order). When a new item is observed and no entry is found for this item in either the first list or the second list, the corresponding item key is hashed into the array H[k] and the same procedure as in FSS is followed in order to decide whether or not this key should be inserted into the first list (ahead of all items with the same estimate count, so as to stay longer in the list). A new key 210 (upon satisfying the criteria for inclusion in the first list 202) is added to the first list 202 resulting in the last key 212 being evicted from the first list (under the condition that the first list 202 is full and thus needs to create storage space for the new item 210).

If an entry for the observed item (key) 214 does exist in the first list, then if the updated hit count $f_{212}$-$\Delta_{212}$ (i.e., the number of times item 212 was observed after it was first added to the first list) is greater than the number of hits (hit count) for the last element in the second list having a minimum hit count $h_{min}$, the observed key 212 is transferred (upgraded) to the second list as indicated by 214. Otherwise the estimate count $f_{212}$ for this item is incremented and, if needed, the item is moved closer to the beginning of the first list as indicated by 216. If the observed key 212 is upgraded and if the number of keys $m_1$ in the second list became greater than a pre-determined maximum limit, then the last key 218 from the second list is inserted into the first list based on its estimate count. If a new instance of an old key is observed in the data set (i.e., entry for an observed item (key) already exists in the second list) the hit count for the old key in the second list in incremented and if needed, the key is moved closer to the beginning of the second list as indicated by 220. In accordance to one embodiment of the present invention, the FSS2L framework protects "old" keys 204 from being washed out from the list by the inflow of new keys 202 that are unlikely to be hit again which is especially important for heavy-tailed key distributions.

In one embodiment the pre-determined maximum limit is selected as ¾ of the maximum number of keys that the algorithm can track. The maximum number of keys may be set as $$\frac{m}{2}$$

in order to be consistent with the FSS algorithm.

Figure 3:
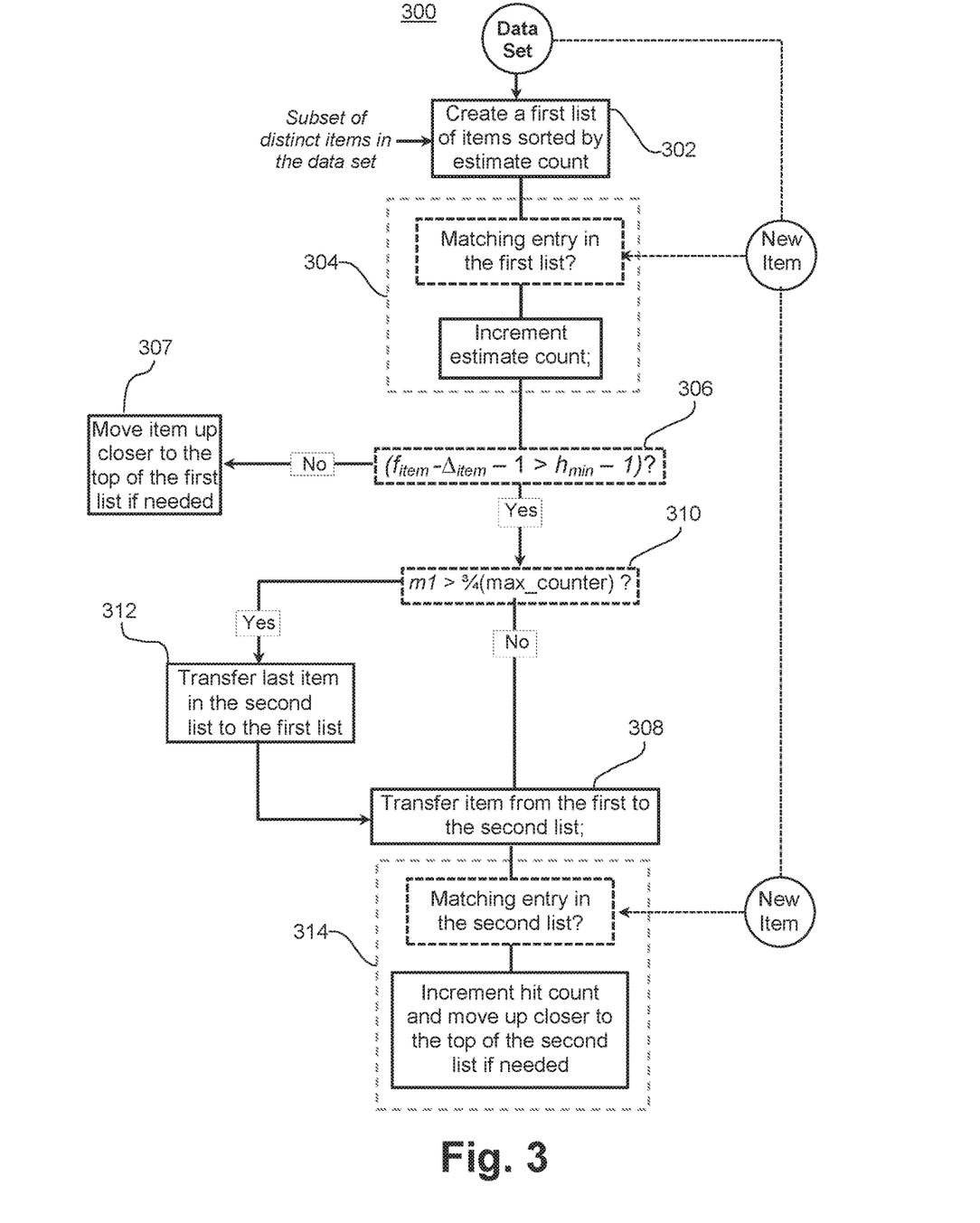
FIG. 3 is a flow diagram representing the operation of an algorithm for generating a list of the top most frequent items and item frequencies from a data set, in accordance to one embodiment of the present invention.

FIG. 3 illustrates the operation of system or algorithm for generating a list of most common items and respective item frequencies from a data set based on the FSS2L framework, in accordance to an embodiment of the invention In one embodiment, the functionality shown by flow diagram 300 of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Turning to flow diagram 300, at 302 a first list of items sorted by the estimate count value is created from the data set. Generally the first list of item, also referred to as the unprotected list (e.g., list 202 of FIG. 2), includes a subset of distinct items in the data set.

At 304 monitoring of the estimate count for each item in the first list is implemented whereby the estimate count for an item in the first list is incremented for every occurrence or observation of that item in the data set. Subsequently, the item is moved closer to the top of the first list if needed in accordance with the estimate count based sorting order of the first list as indicated by 307. This operation is performed for every item in the first list.

In one embodiment, after every incrementation of an item's estimate count in the first list, a hit count value for that item, corresponding to the number of times the item is observed after it has been included in the first list, is checked against a threshold hit count as shown by 306. The hit count value for the item is calculated by subtracting the maximum error, $\Delta_{item}$, associated with the item's estimate count, from the item's estimate count value, $f_{item}$.

At 308 an item exceeding the threshold hit count, $h_{min}$, is transferred from the first list to a second list (e.g., list 206 of FIG. 2), wherein the items in the second list are sorted by the hit count value. The threshold hit count corresponds to the minimum hit count stored in the second list of items.

At 312 the second list has reached a pre-determined maximum size (the size of the list has reached a pre-determined maximum limit) as indicated by 310. Therefore, an item is displaced from the second list and transferred back to the first list prior to the transferring of an item, exceeding the threshold hit count, from the first list to the second list. The item displaced from the second list, to enable the transfer of an item from the first list, corresponds to the minimum hit count value stored in the second list. The second list of items is sorted by the hit count in a descending order, according to an embodiment of the invention, therefore, the minimum hit count stored in the second list generally corresponds to the last item in the second list.

At 314 monitoring of the hit count for each item in the second list is implemented. The hit count for an item in the second list is incremented for every occurrence or observation of that item in the data set. Subsequently the item is moved closer to the top of the second list if needed in accordance with the hit count based sorting order of the second list as indicated by 314. This operation is performed for every item included in the second list.

Efficient implementation of frequency estimation algorithms discussed above should include the ability to quickly locate the key with the smallest frequency $f_{min}$ when it needs to be evicted from the memory (hash map). In order to make this eviction operation happen in O(1) time, the counters may be stored in a Stream Summary data structure.

Figure 4:
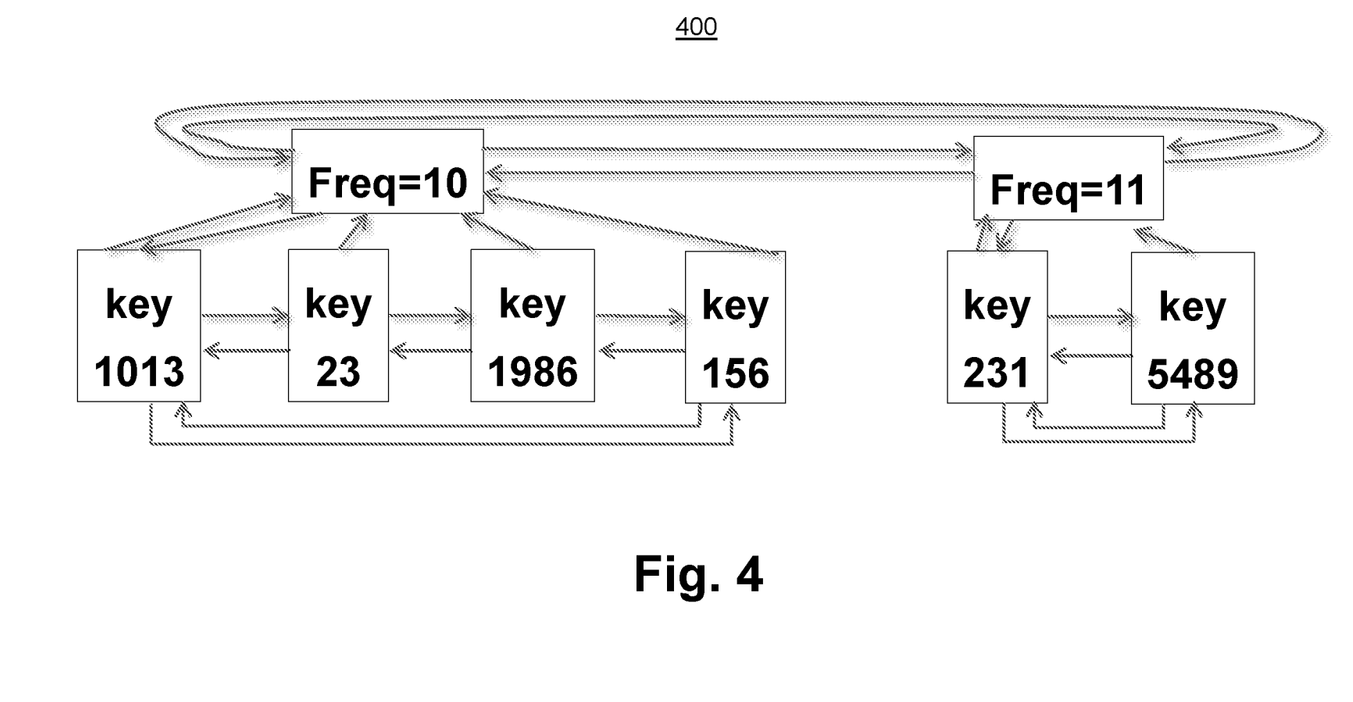
FIG. 4 is a block diagram representation of a double-linked Stream Summary data structure for storing keys and estimated item frequencies information, in accordance to one embodiment of the present invention.

FIG. 4 illustrates a block diagram for a Stream Summary data structure 400 for implementing the first list (unprotected list) according to one embodiment. Each element in the top-level double linked list is a "bucket" with a specified frequency $F_b$, (either 10 or 11 in FIG. 4) which contains its own linked list of nodes to store keys that have estimated frequency $F_b$. The nodes are always added to the end of the list inside each bucket. If the first list has exceeded its maximum size, then the first node in the first bucket is removed. Each "bucket" maintains pointers to the first node and to the last node on its list, which makes insertion and removal operations take O(1) time in the linked list. When a key that is present in the list with an estimate count (estimated frequency) $f_i$ is observed in the data set, it is moved to the end of the linked list in the bucket with $F_b = f_i + 1$, and if such a bucket does not exist, a new bucket is created (and is inserted into a proper location in the list of buckets so as to still keep it sorted by estimate count) and the node with the observed key is added to the list of nodes in that bucket.

Stream Summary data structure 400 utilizes a doubly linked list of nodes in each bucket in order to make the removal of a node from its current location happen in O(1) time, otherwise, a linear search will be needed in order to find the node before the one being removed, so that it could then be linked with the node after the one being removed. Further, if the hash map is utilized for holding pointers into the Stream Summary, no linear search would be needed in order to find specific keys in it. This implementation stores 2 numbers in the hash map for each monitored key on the first list, the key and the pointer to the Stream Summary node, and stores 4 numbers in the corresponding node, the key and the pointers to the parent bucket, to the previous node and to the next node.

In general, unless the number of highly-frequent items is larger than m, the top level list (the list of buckets) in the Stream Summary will rarely have more than two buckets. This is because between two successive observations of any key, many more keys than m are likely be observed. As a result, insertions of new keys will be much more common than hits to existing keys, and since each new key is inserted with frequency equal to $f_{min}+1$, which is either equal to the frequency of the first bucket in the Stream Summary or is greater than it by 1, only two buckets are likely to be present in the Stream Summary.

However this does not work for the items in second list because the items in the second list are sorted by the hit count (number of hits they received). As a result, if the Stream Summary data structure is used to store items in the second list, then the number of buckets is unlikely to be much smaller than the number of keys in the list. Therefore, it would be more space efficient to just use a plain doubly linked list of nodes, with each node storing the key, its frequency, its maximum error as well as pointers to the next and the previous node (a total of 5 numbers). Altogether, this implementation store 7 numbers for each key in the second list: the key and a pointer in the hash map and 5 numbers in the linked list.

Figure 5:
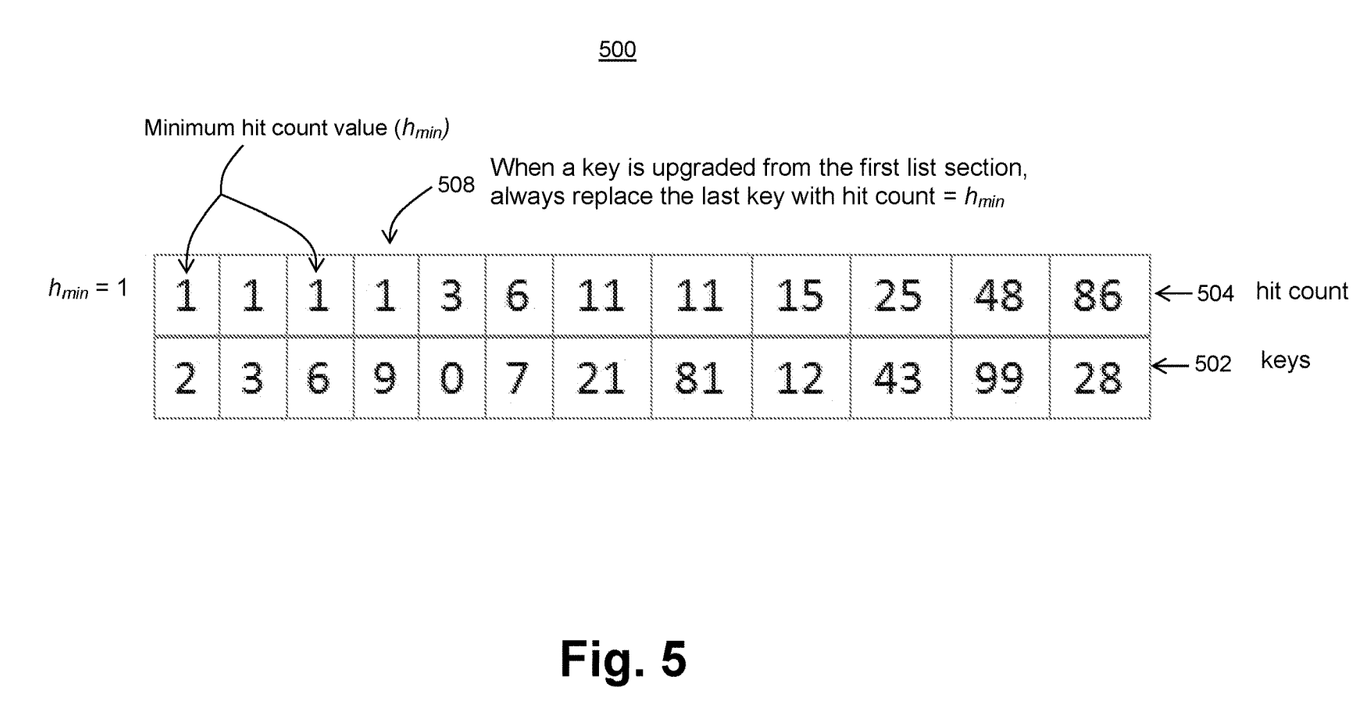
FIG. 5 is block diagram representation of the Hits-sorted array of keys in the second list (protected list), in accordance to one embodiment of the present invention.

One embodiment of the invention provides a more space-efficient approach for storing keys on the second list as illustrated by an array structure 500 in FIG. 5. Array structure 500 represents an array of keys 502 sorted by hit count value 504, where the estimated frequency and the maximum error for each key is stored in a hash map. In order to enable finding an observed key in array 500 using an efficient binary search based on the hit count value of the key computed from its estimated frequency and maximum error stored in the hash map, it is also useful to store the hit count value 504 for every key in the array of keys 502 as well (e.g., array 500 of FIG. 5). Otherwise, during every comparison made by the binary search, the hash map would need to be searched for the entry of each compared key in order to compute its hit count value.

Insertions of new keys into the second list, as illustrated by array 500, involves shifting down all elements below the insertion point, but such insertions usually happen close to the end of the array, because the inserted items usually have a hit count value equal to the minimum hit count ($h_{min}$) value. In the rare case when several items in the second list all have hit count values corresponding to minimum hit count ($h_{min}$) value, then one of them gets removed and placed into the first list, and is then accessed again while in the first list, it will come back to the second list with its hit count value equal to $h_{min}+1$. Since the items in the second list are likely to have distinct values of "hit counts" upgrades to a new position in the array will usually require just a swapping of two elements (e.g., the upgraded item from the first list with key 508 in the second list which corresponds to the last key with a minimum hit count value in array 500). In one embodiment of the invention, a key that is upgraded from the first list always replaces the last key with a minimum hit count value in the second list.

The second list array implementation according to the embodiment illustrated in FIG. 5 is also faster than the linked list implementation described earlier. The linked list implementation spends a lot of time performing a linear search for the node that has a larger hit count than the node holding the key that was observed and was found to be present in the second list (such a key needs to be moved up in the list so as to still keep it sorted by hit count). The array-based implementation also needs to perform this task, but it accomplishes it using a binary search in logarithmic time. Thus, one embodiment of the invention utilizes the array-based implementation of the second list and a linked list implementation, using the doubly linked list Stream Summary structure described above, of the first list, resulting in an FSS-Array-List ("FSSAL") embodiment.

The disclosed embodiment of the second list array implementation 500 results in a significant speed up in the binary search process. Altogether, array implementation 500 will require storing only 5 numbers for each key in the second list: the key, its estimated frequency and its error in the hash map, and the key and its hit count value in the sorted array One embodiment of the invention implements a speed up in the operation of the FSSAL algorithm by breaking up the "old" hash map (corresponding to the second list), into an array M of the same size as H, with M[k] storing a hash map for those "old" keys (stored in the second list) that hash to k. In this way, every operation with the "old" hash map will become faster as it will be done on a much smaller hash map. As a result, the overall execution time for FSSAL is reduced by 4-5%. This speedup implementation does not require any extra space consumption.

Another embodiment of the invention optimizes the FSSAL algorithm by reducing its space consumption. This optimization is based on the observation that with a good uniform hashing of keys into the hash array, the difference between $\max_k$ H[k] and $\min_k$ H[k] is small. Therefore, after observing every M keys (where M can be 10 times the size of H), $\min_k$ H[k] is computed and is added to a variable that holds the common amount subtracted so far from all cells in H, while all cells in the hash array are decremented by $\min_k$ H[k]. As a result, it is sufficient to restrict cells in the hash array to store nonnegative integers that are less than $2^{16}$ (i.e., take up only 2 bytes each). Then, the criterion for inserting a key that hashes to cell k into the first list would be H[k]+$H_c \geq f_{min}$-1. Also, when a key that hashes to cell j is removed from H, H[j]=max($f_{min}$-$H_c$,H[j]), where the max( ) operator would be used because if the key with frequency equal to $f_{min}$ was recently moved from the second list to the first list, its estimated frequency could be much less than those for some cells in H.

There are cases when it is undesirable to have a linked list implementation for the frequency estimation algorithm. For example, if the data structures need to be written to disk periodically and then read from disk, then the pointer information will become inaccurate. Also, in the linked list implementation of FSSAL described above, the number of nodes representing keys on the first list can initially grow to be equal to $$\frac{m}{2},$$

and then the unused nodes will need to be deallocated as the second list grows to its maximum size of $$\frac{3}{8}m$$

while first list shrinks down to $$\frac{1}{8}m,$$

wherein m represent the total size of the memory allocated for the algorithm. Deallocation of memory can be hard to implement in some contexts, and the deallocated memory may not be reusable until the algorithm finishes its data processing. In order to overcome these practical concerns a single array implementation of the FSS2L framework, referred to as FSSA algorithm, is disclosed in accordance to one embodiment of the invention.

Figure 6:
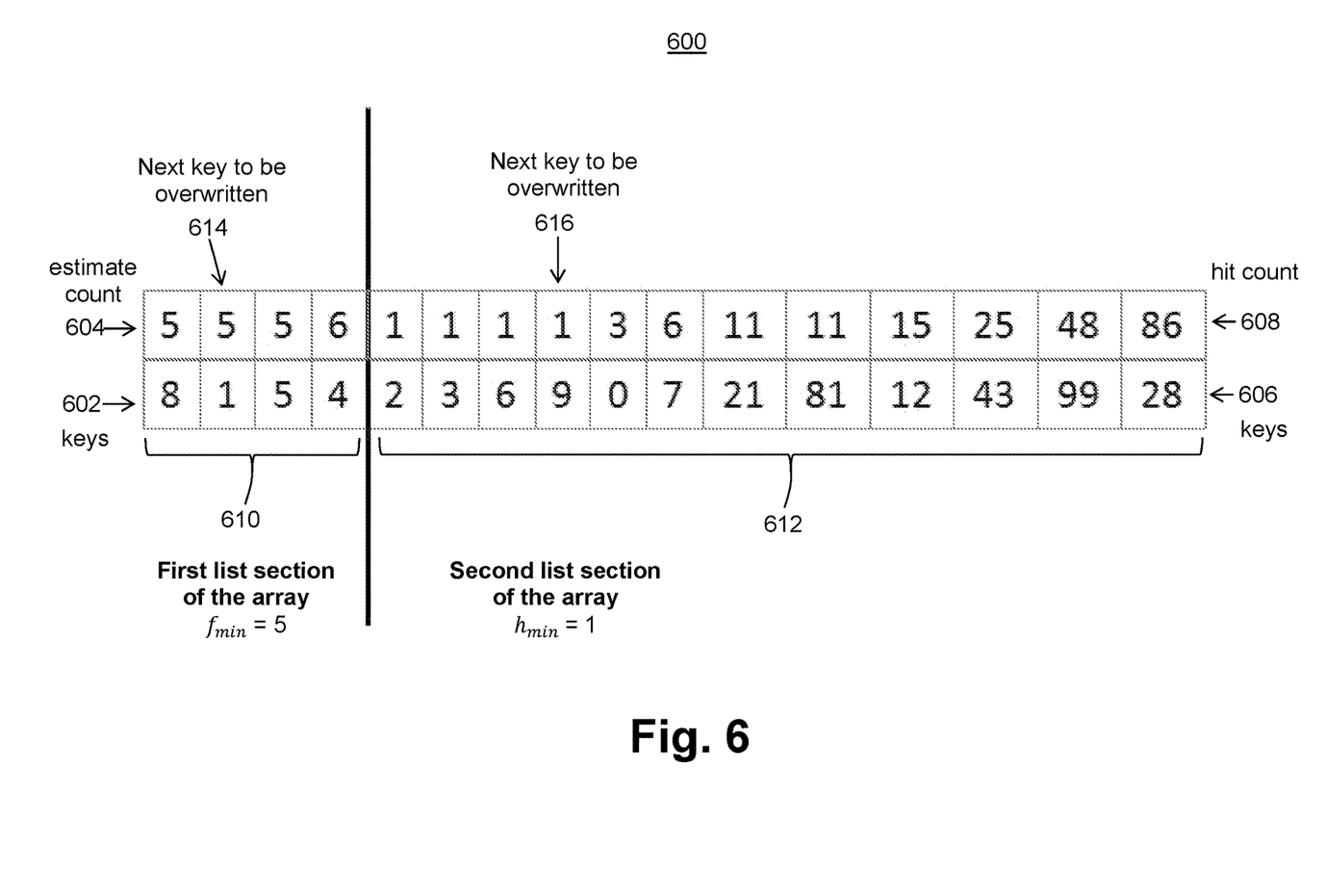
FIG. 6 is a block diagram representation of the two-dimensional array data structure, in accordance to one embodiment of the present invention.

A two-dimensional array structure 600 for implementation of the FSSA algorithm, in accordance to an embodiment, is illustrated in FIG. 6. The array structure 600 is of size $$\frac{m}{2}$$

by-2 to store some information about the monitored keys. Array 600 stores keys 602 that conceptually belong to the first list, with its estimated frequency 604. Keys 606 belong (conceptually) to the second list, and therefore array 600 stores the key and its hit count 608. Keys 602 from the first list are kept together at the front of the array, represented by array section 610, and are sorted by estimated frequency 604, while the keys from the second list are kept together at the end of the array, represented by array section 612, and are sorted by hit count. For keys from the first list, the frequency and the maximum error is stored in HashMap0, while for keys from the second list, this information is stored in an array M of hash maps, similar to FSSAL.

In order to make insertions of new keys into the first list section 610 of the array more efficient, instead of always inserting new keys after all other keys with estimated frequency equal to the minimum estimated frequency value in the first list, represented by $f_{min}$ and denoted by 612, FSSA cycles through those keys and overwrites them one after another. In order to accomplish this, FSSA stores the index of the next key to be overwritten (at array location 614) and the largest index for which a key still has estimated frequency equal to the minimum estimated frequency ($f_{min}$). Similarly, in order to make "upgrades" of keys from the first list section 610 to the second list section 612 more efficient, FSSA stores the index of the next key to be overwritten in the second list, indicated by 616, and the largest index for which a key still has hit count value equal to the minimum hit count ($h_{min}$). Also, in order to minimize movement of memory within this array, when FSSA increments the estimated frequency for key i and decides to move it closer toward the end of the first list section 610, it simply finds, using binary search, the last key that has frequency equal to $f_i$ and swaps it with key i (which will now have frequency $f_i$+1. A similar strategy is used when incrementing the hit count value for a key in the second list section 612.

A common step in all the embodiments discussed above is checking whether or not an entry for the observed key exists in an appropriate hash map, which on average takes O(1) time. If the hash map does contain such an entry, then this entry needs to be retrieved, which takes O(log(m)) time for the SS algorithm. When an entry needs to be removed from the SS hash map, the O(log(m)) cost is incurred once again. If the double linked-list Stream Summary data structure described above is used by SS to store information about each key and a hash map is used to store pointers into Stream Summary, then all Stream Summary operations take constant time. Such an implementation requires storing, for each key, two numbers in the hash structure (the key and the pointer to the node in the Stream Summary) and four numbers in the Stream Summary (the key, the pointer to the next node, the pointer to the previous node, and the pointer to the parent bucket). Thus, the SS algorithm requires storing 6 m numbers if there is a need to get a list of m most frequent keys.

The FSS algorithm, previously disclosed, in general requires sorting counters both by frequency and by error, and therefore stores both the frequency and error for each key. If the Stream Summary data structure and a hash search structure are used, then a total of 7 numbers would need to be stored for each key (one more than for the SS algorithm described above). However, the secondary sorting of keys by maximum possible error gives a negligible additional benefit to FSS (while the hash array gives almost all additional benefit relative to SS). Thus, a slightly simplified version of FSS can be implemented while storing only 6 numbers for each key, as in the SS algorithm. However, since FSS stores only half as many counters as SS, a total of 3 m numbers would need to be stored for all monitored keys.

In addition to monitored keys, the FSS algorithm also stores a hash array, and a baseline size for this array is generally 3 times the number of monitored keys, which is $$\frac{3m}{2}.$$

If the hash array is implemented using 2 bytes for each cell as was described earlier, while each key and each pointer uses 8 bytes in order to handle very large memory spaces (like the ones used in modern servers), then the total space taken by FSS would be equal to the one occupied by $$3m + \frac{3m}{2}\frac{1}{4} = \frac{27}{8}m$$

8-byte numbers. This is a significant space improvement relative to SS, which at the same time brings with it an increased accuracy. The FSS operations are essentially the same as those for SS, but because it monitors at most $$\frac{m}{2}$$

keys, the hash map operations take a little less time than in the SS algorithm, even though they still take on the order of O(log(m)) time. More importantly, however, is that FSS needs to do many fewer such operations, since an observed key is not always added to the hash map. Thus, FSS algorithm has a noticeably smaller computation time than SS.

The FSSAL algorithm described above stores 5 numbers for each key on the second list: the key, its frequency (estimate count), and its maximum error in the hash map and then the key and its hit count value in the sorted array, and then stores 6 numbers for each key in the first list, just like FSS for each of its keys. Since the second list can hold at most $$\frac{3}{4}$$

of all monitored keys, it would consume the space equivalent to $$5\frac{m}{2}\frac{3}{4} = \frac{15}{8}m$$

numbers (8 bytes each). Since the first list eventually holds only $$\frac{1}{4}$$

or all monitored keys, it would consume the space equivalent to $$6\frac{m}{2}\frac{1}{4} = \frac{6}{8}m$$

numbers. If the hash array is implemented as described for the FSS algorithm above, then it would consume the space equivalent to $$\frac{3}{8}m$$

numbers. Thus, the total space used by FSSAL would be equivalent to $$\frac{15}{8}m + \frac{6}{8}m + \frac{3}{8}m = 3m$$

numbers of 8 bytes each. The Stream Summary operations with the first list in FSSAL take O(1) time just like in FSS, but binary searches in the second list take on the order of O(log(m)) time. All the hash map operations also take on the order of O(log(m)).

The FSSA algorithm stores 5 numbers for each monitored key, and if its hash array is implemented as described above, then its total space consumption would be equivalent to $$5\frac{m}{2} + \frac{3}{8}m = \frac{23}{8}m$$

numbers (8 bytes each), which is slightly less than the space consumption of the FSSAL algorithm. The maximum operational time for FSSA is bounded by O(log(m)) because keys in the array are found using binary search.

Experimental results below show that the prior art SS has the largest run time and FSSAL/FSSA, in accordance to embodiments of the invention, have the smallest run times. The experiments also show that FSSAL/FSSA have the best accuracy, while SS has the worst accuracy unless the problem is very easy due to a very large skew.

The accuracy of the algorithms is measured in several ways. One of them is the number of sequential true top N most frequent keys (referred to as "heavy hitters") detected by the algorithm, referred to as the "topN sequence." For example, if key 1 is the most frequent, key 2 is the next most frequent, and so on, and if the algorithm detects keys 1, 2, 3, 4, but misses key 5, then topN sequence=4. However, even if an algorithm detects the top 4 most frequent keys, it can still have very large frequency estimation errors. Therefore, in order to monitor this aspect of accuracy, the Mean Absolute Error for each algorithm is determined over the top 5000 keys on its list. Finally, the percentage of the true top-5000 heavy-hitters detected by each algorithm is measured.

In the experiments below, a Zipf distribution is generated over 1 million keys, and then 1 million keys are randomly drawn from this distribution and processed by each algorithm. The value of m is set to 10000.

Zipf(0.5):
Average number of observed keys in the stream of length 1000000=557068
Average frequency of the most frequent key=495, average freq of all observed keys=1.80
SS results over 20 trials:
Average percentage of top-5000 heavy-hitters on the SS list=11.58, standard error=0.10
Average detected topN sequence length for SS=30.0, standard error=1.41
Average MAE over top-5000 items=94.56, standard error=0.02
Average time used by the SS algorithm=2036 ms, standard error=21 ms
FSS results over 20 trials:
Average percentage of top-5000 heavy-hitters on the FSS list=11.17, standard error=0.10
Average detected topN sequence length for FSS=76.7, standard error=1.57
Average MAE over top-5000 items=48.94, standard error=0.02
Average time used by the FSS algorithm=1338 ms, standard error=14 ms
FSSAL results over 50 trials:
Average percentage of top-5000 heavy-hitters on the FSSAL list=36.01, standard error=0.29
Average detected topN sequence length for FSSAL=219.1, standard error=7.96
Average MAE over top-5000 items=29.96, standard error=0.08
Average time used by the FSSAL algorithm=978 ms, standard error=4 ms
FSSA results over 50 trials:
Average percentage of top-5000 heavy-hitters on the FSSA list=35.38, standard error=0.30
Average detected topN sequence length for FSSA=232.5, standard error=5.76
Average MAE over top-5000 items=29.36, standard error=0.10
Average time used by the FSSA algorithm=871 ms, standard error=3 ms
Zipf(1):
Average number of observed keys in the stream of length 1000000=217121
Average frequency of the most frequent key=69394, average freq of all observed keys=4.61
SS results over 20 trials:
Average percentage of top-5000 heavy-hitters on the SS list=55.79, standard error=0.26
Average detected topN sequence length for SS=1143.0, standard error=12.00
Average MAE over top-5000 items=27.87, standard error=0.09
Average time used by the SS algorithm=1027 ms, standard error=12 ms
FSS results over 20 trials:
Average percentage of top-5000 heavy-hitters on the FSS list=67.09, standard error=0.31
Average detected topN sequence length for FSS=1679.5, standard error=22.46
Average MAE over top-5000 items=10.68, standard error=0.11
Average time used by the FSS algorithm=567 ms, standard error=4 ms
FSSAL results over 50 trials:
Average percentage of top-5000 heavy-hitters on the FSSAL list=76.71, standard error=0.19
Average detected topN sequence length for FSSAL=1886.9, standard error=24.68
Average MAE over top-5000 items=7.28, standard error=0.18
Average time used by the FSSAL algorithm=752 ms, standard error=15 ms
FSSA results over 50 trials:
Average percentage of top-5000 heavy-hitters on the FSSA list=76.83, standard error=0.20
Average detected topN sequence length for FSSA=1878.5, standard error=28.92
Average MAE over top-5000 items=7.33, standard error=0.19
Average time used by the FSSA algorithm=665 ms, standard error=14 ms
Zipf(1.5):
Average number of observed keys in the stream of length 1000000=13363
Average frequency of the most frequent key=383065, average freq of all observed keys=74.84
SS results over 50 trials:
Average percentage of top-5000 heavy-hitters on the SS list=79.81, standard error=0.09
Average detected topN sequence length for SS=1496.0, standard error=26.68
Average MAE over top-5000 items=0.20, standard error=0.00
Average time used by the SS algorithm=119 ms, standard error=1 ms
FSS results over 50 trials:
Average percentage of top-5000 heavy-hitters on the FSS list=68.60, standard error=0.09
Average detected topN sequence length for FSS=1279.9, standard error=14.18
Average MAE over top-5000 items=0.30, standard error=0.01
Average time used by the FSS algorithm=159 ms, standard error=1 ms
FSSAL results over 50 trials:
Average percentage of top-5000 heavy-hitters on the FSSAL list=70.30, standard error=0.08
Average detected topN sequence length for FSSAL=1294.9, standard error=16.07
Average MAE over top-5000 items=0.25, standard error=0.01
Average time used by the FSSAL algorithm=283 ms, standard error=1 ms
FSSA results over 50 trials:
Average percentage of top-5000 heavy-hitters on the FSSA list=70.26, standard error=0.09

Average detected topN sequence length for FSSA=1295.7, standard error=16.51
Average MAE over top-5000 items=0.25, standard error=0.01
Average time used by the FSSA algorithm=217 ms, standard error=1 ms In the experiments below, a key is randomly selected from the exponential density $f(x)=a \cdot e^{-b \cdot x}$, where b is the skew parameter (referred to as "ExpPar" for clarity) and a is a suitably chosen constant to make the density integrate to 1 on the support [0, NumKeys]. For consistency with experiments in the previous section, Num Keys is chosen to be 1000000. Just as before, the value of m is set to 10000.

ExpPar=0.0001

Average number of observed keys in the stream of length 1000000=51831
Average frequency of the most frequent key=101, average freq of all observed keys=19.30
SS results over 50 trials:
Average percentage of top-5000 heavy-hitters on the SS list=69.52, standard error=0.27
Average detected topN sequence length for SS=19.7, standard error=2.34
Average MAE over top-5000 items=29.75, standard error=0.06
Average time used by the SS algorithm=1160 ms, standard error=4 ms
FSS results over 50 trials:
Average percentage of top-5000 heavy-hitters on the FSS list=78.67, standard error=1.41
Average detected topN sequence length for FSS=588.2, standard error=64.69
Average MAE over top-5000 items=12.38, standard error=1.94
Average time used by the FSS algorithm=614 ms, standard error=22 ms
FSSAL results over 50 trials:
Average percentage of top-5000 heavy-hitters on the FSSAL list=81.26, standard error=0.96
Average detected topN sequence length for FSSAL=613.5, standard error=71.57
Average MAE over top-5000 items=7.76, standard error=1.06
Average time used by the FSSAL algorithm=845 ms, standard error=15 ms
FSSA results over 50 trials:
Average percentage of top-5000 heavy-hitters on the FSSA list=81.57, standard error=0.98
Average detected topN sequence length for FSSA=604.5, standard error=68.27
Average MAE over top-5000 items=7.71, standard error=1.09
Average time used by the FSSA algorithm=658 ms, standard error=17 ms ExpPar=0.00015

Average number of observed keys in the stream of length 1000000=37259
Average frequency of the most frequent key=152, average freq of all observed keys=26.86
SS results over 50 trials:
Average percentage of top-5000 heavy-hitters on the SS list=87.06, standard error=0.15
Average detected topN sequence length for SS=2130.5, standard error=44.81
Average MAE over top-5000 items=7.08, standard error=0.03
Average time used by the SS algorithm=905 ms, standard error=4 ms
FSS results over 50 trials:
Average percentage of top-5000 heavy-hitters on the FSS list=89.32, standard error=0.89
Average detected topN sequence length for FSS=2347.4, standard error=95.54
Average MAE over top-5000 items=5.63, standard error=1.46
Average time used by the FSS algorithm=504 ms, standard error=17 ms
FSSAL results over 50 trials:
Average percentage of top-5000 heavy-hitters on the FSSAL list=90.24, standard error=0.65
Average detected topN sequence length for FSSAL=2358.1, standard error=104.00
Average MAE over top-5000 items=4.44, standard error=0.97
Average time used by the FSSAL algorithm=839 ms, standard error=14 ms
FSSA results over 50 trials:
Average percentage of top-5000 heavy-hitters on the FSSA list=90.31, standard error=0.65
Average detected topN sequence length for FSSA=2364.8, standard error=105.74
Average MAE over top-5000 items=4.42, standard error=0.99
Average time used by the FSSA algorithm=644 ms, standard error=15 ms ExpPar=0.0002

Average number of observed keys in the stream of length 1000000=29377
Average frequency of the most frequent key=201, average freq of all observed keys=34.06
SS results over 50 trials:
Average percentage of top-5000 heavy-hitters on the SS list=94.71, standard error=0.03
Average detected topN sequence length for SS=4074.1, standard error=32.46
Average MAE over top-5000 items=0.76, standard error=0.00
Average time used by the SS algorithm=717 ms, standard error=4 ms
FSS results over 50 trials:
Average percentage of top-5000 heavy-hitters on the FSS list=93.05, standard error=0.63
Average detected topN sequence length for FSS=3200.9, standard error=76.72
Average MAE over top-5000 items=3.15, standard error=1.10
Average time used by the FSS algorithm=456 ms, standard error=13 ms
FSSAL results over 50 trials:
Average percentage of top-5000 heavy-hitters on the FSSAL list=93.33, standard error=0.49
Average detected topN sequence length for FSSAL=3197.3, standard error=85.47
Average MAE over top-5000 items=2.71, standard error=0.82
Average time used by the FSSAL algorithm=824 ms, standard error=13 ms
FSSA results over 50 trials:
Average percentage of top-5000 heavy-hitters on the FSSA list=93.38, standard error=0.48

Average detected topN sequence length for FSSA=3184.4, standard error=84.37

Average MAE over top-5000 items=2.70, standard error=0.84

Average time used by the FSSA algorithm=633 ms, standard error=14 ms

Results disclosed above show that both FSSA and FSSAL, in accordance with embodiments of the invention, are consistently better than the prior art FSS on all accuracy metrics: they detect more consecutive topN most frequent items starting from the first one, they detect more top-5000 most frequent items and they have a smaller average absolute frequency estimation error. The degree of superiority of FSSA and FSSAL increases as the frequency estimation problem becomes harder (i.e., as the dataset becomes less skewed and frequent items become harder to detect). For very easy problems, such as exponential distribution of keys with ExpPar>0.0002, FSS can just as easily detect the most frequent items as FSSA or FSSAL and matches some of their accuracy metrics, such as the length of the detected topN sequence (for ExpPar=0.0002). Also, in such easy problems SS starts to outperform all other algorithms simply because it can track twice as many keys, and its very simplistic strategy of always replacing the last key on the list with a key that has never been seen before does not affect the most frequent keys, which quickly propagate to the top of the list.

It should be noted that for each value of the skew parameter, all algorithms were run on the same data set during each trial, and so the accuracy of all algorithms, if plotted against the trial number, usually goes up and down together. Thus, in order to determine whether one algorithm is more accurate than another, we need to record the difference in the accuracy metric of interest for each trial and then compare the average value of the difference with its standard error across trials. This criteria was applied to Zipf(1.5) distribution, and it is observed that when comparing FSS vs. FSSAL or FSS vs. FSSA, the standard error for each performance difference is much smaller than the mean difference, which implies that FSSA and FSSAL do offer a statistically significant accuracy improvement over FSS, even though the standard errors for each performance metric recorded for Zipf Distribution might suggest otherwise.

As disclosed, embodiments allow for one-pass detection of most frequent items and associated item frequencies in a large data set. In accordance to one embodiment of the present invention, information about the frequently observed items are stored in a special protected list, for which new entry and sorting order is based on observed hit count thus protected from being washed out or displaced from the limited memory by a large inflow of new items.

The ability to detect a larger percentage of top N most frequent keys (heavy hitters) and also more accurately estimate their frequencies implies that queries in a database will return more accurate results. Also, this means that downstream query plans will be much more efficient, since heavy hitters can be processed differently from the rest of the keys.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor of a database management system that includes a memory, cause the database management system to estimate frequencies of a predetermined count of most common items in a data set in a single pass through the data set by performing a method, the method comprising:

allocating a first portion of the memory for an unprotected list of a first predetermined size for storing a first count of keys representing items of the data set sorted by estimated frequency;

creating the unprotected list in the first portion of the memory;

allocating a second portion of the memory for a protected list of a second predetermined size for storing a second count of keys representing items of the data set sorted by hit count;

creating the protected list in the second portion of the memory;

receiving a new item from the data set;

determining whether a key corresponding to the new item is stored in the unprotected list or the protected list;

updating the estimated frequency of the new item when it is determined that that the key corresponding to the new item is stored in the unprotected list;

updating the hit count of the new item when it is determined that the key corresponding to the new item is stored in the protected list;

storing the key corresponding to the new item in the unprotected list when the key satisfies criteria for storage in the unprotected list;

evicting a key corresponding to an item having a lowest estimated frequency from the unprotected list in response to the storing when the unprotected list is full;

transferring at least one item having a hit count that exceeds a threshold hit count from the unprotected list to the protected list; and transferring an item having the lowest hit count from the protected list to the unprotected list when the protected list is full.

2. The non-transitory computer readable medium of claim 1, wherein the item transferred from the protected list to the unprotected list corresponds to a minimum hit count stored in the protected list, a position of the item transferred from the protected list to the unprotected list is based on the item's estimated frequency, a sum of the first count and the second count is equal to the predetermined count, and the threshold hit count is equal to a lowest hit count of any item stored in the protected list.

3. The non-transitory computer readable medium of claim 1, wherein the item transferred from the protected list to the unprotected list corresponds to a minimum hit count stored in the protected list, wherein the data set is stored by the database management system.

4. The non-transitory computer readable medium of claim 3, wherein each item group from the one or more item groups comprises a group count which is incremented at every occurrence of an item in the data set belonging to that item group.

5. The non-transitory computer readable medium of claim 4, wherein the unprotected list is comprised of distinct items whose occurrence in the data set causes the group count to exceed a minimum estimated frequency stored in the unprotected list.

6. The non-transitory computer readable medium of claim 5, wherein the estimated frequency for each item in the unprotected list has an initial value and a maximum error value, and wherein the maximum error value associated with the estimated frequency is one less than the initial value associated with the estimated frequency.

7. The non-transitory computer readable medium of claim 6, wherein the protected list comprises a hash map for storing the estimated frequency and the maximum error for each item in the protected list, and an array data structure for holding the hit count for each item in the protected list.

8. The non-transitory computer readable medium of claim 1, wherein the unprotected list comprises a double-linked Stream Summary data structure for storing item key and estimated frequency information and a hash map for holding pointers into the double-linked Stream Summary data structure.

9. The non-transitory computer readable medium of claim 1, wherein the unprotected list and the protected list are represented by a single two dimensional array structure, wherein the items associated with the unprotected list are stored together at a front of the two dimensional array and sorted by the estimated frequency, and wherein the items associated with the protected list are stored together at a back of the two dimensional array and sorted by the hit count.

10. A computer-implemented method for generating a list of most common items and respective item frequencies from a data set comprising a plurality of items in database management system that includes a memory, the computer-implemented method comprising:
    allocating a first portion of the memory for an unprotected list of a first predetermined size for storing a first count of keys representing items of the data set sorted by estimated frequency;
    creating the unprotected list in the first portion of the memory;
    allocating a second portion of the memory for a protected list of a second predetermined size for storing a second count of keys representing items of the data set sorted by hit count;
    creating the protected list in the second portion of the memory;
    receiving a new item from the data set;
    determining whether a key corresponding to the new item is stored in the unprotected list or the protected list;
    updating the estimated frequency of the new item when it is determined that that the key corresponding to the new item is stored in the unprotected list;
    updating the hit count of the new item when it is determined that the key corresponding to the new item is stored in the protected list;
    storing the key corresponding to the new item in the unprotected list when the key satisfies criteria for storage in the unprotected list;
    evicting a key corresponding to an item having a lowest estimated frequency from the unprotected list in response to the storing when the unprotected list is full;
    transferring at least one item having a hit count that exceeds a threshold hit count from the unprotected list to the protected list; and
    transferring an item having the lowest hit count from the protected list to the unprotected list when the protected list is full.

11. The computer-implemented method of claim 10, wherein the item transferred from the protected list to the unprotected list corresponds to a minimum hit count stored in the protected list, and a position of the item transferred from the protected list to the unprotected list is based on the item's estimated frequency.

12. The computer-implemented method of claim 10, wherein the transferred from the protected list to the unprotected list corresponds to a minimum hit count stored in the protected list; and
wherein each item group from the one or more item groups comprises a group count which is incremented at every occurrence of an item in the data set belonging to that item group.

13. The computer-implemented method of claim 12, wherein the unprotected list is comprised of distinct items whose occurrence in the data set causes the group count to exceed a minimum estimated frequency stored in the unprotected list.

14. The computer-implemented method of claim 13, wherein the estimated frequency for each item in the unprotected list has an initial value and a maximum error value; and
wherein the maximum error value associated with the estimated frequency is one less than the initial value associated with the estimated frequency.

15. The computer-implemented method of claim 14, wherein the protected list comprises a hash map for storing the estimated frequency and the maximum error for each item in the protected list, and an array data structure for holding the hit count for each item in the protected list.

16. The computer-implemented method of claim 10, wherein the unprotected list of items and the protected list are represented by a single two dimensional array structure, wherein the items associated with the unprotected list are stored together at a front of the two dimensional array and sorted by the estimated frequency; and
wherein the items associated with the protected list are stored together at a back of the two dimensional array and sorted by the hit count.

17. A system for generating a list of most common items and respective item frequencies from a data set comprising a plurality of items, comprising one or more processors operatively connected to a data storage and a memory and configured as:
    a data receiving module configured to receive the data set comprising the plurality of items; and
    a data item frequency estimation module configured to:
        allocate a first portion of the memory for an unprotected list of a first predetermined size for storing a first count of keys representing items of the data set sorted by estimated frequency;
        create the unprotected list in the first portion of the memory;
        allocate a second portion of the memory for a protected list of a second predetermined size for storing a second count of keys representing items of the data set sorted by hit count;
        create the protected list in the second portion of the memory;
        receive a new item from the data set;
        determine whether a key corresponding to the new item is stored in the unprotected list or the protected list;
        update the estimated frequency of the new item when it is determined that that the key corresponding to the new item is stored in the unprotected list;

update the hit count of the new item when it is determined that the key corresponding to the new item is stored in the protected list;

store the key corresponding to the new item in the unprotected list when the key satisfies criteria for storage in the unprotected list;

evict a key corresponding to an item having a lowest estimated frequency from the unprotected list in response to the storing when the unprotected list is full;

transfer at least one item having a hit count that exceeds a threshold hit count from the unprotected list to the protected list; and transfer an item having the lowest hit count from the protected list to the unprotected list when the protected list is full.

18. The system of claim 17, wherein the item transferred from the protected list to the unprotected list corresponds to a minimum hit count stored in the protected list, a position of the item transferred from the protected list to the unprotected list is based on the item's estimated frequency, and the threshold hit count is equal to a lowest hit count of any item stored in the protected list.

19. The system of claim 17, wherein the protected list comprises a hash map for storing the estimated frequency and the maximum error for each item in the protected list, and an array data structure for holding the hit count for each item in the protected list.

20. The system of claim 17, wherein the unprotected list and the protected list are represented by a single two dimensional array structure;

wherein the items associated with the unprotected list are stored together at a front of the two dimensional array and sorted by the estimated frequency; and wherein the items associated with the protected list are stored together at a back of the two dimensional array and sorted by the hit count.

* * * * *

UNITED STATES PATENT AND TRADEMARK OFFICE
CERTIFICATE OF CORRECTION

PATENT NO.        : 10,496,511 B2
APPLICATION NO.   : 15/275711
DATED             : December 3, 2019
INVENTOR(S)       : Vengerov Page 1 of 1

It is certified that error appears in the above-identified patent and that said Letters Patent is hereby corrected as shown below:

In the Specification

In Column 6, Line 41, after "invention" insert -- . --.

In Column 9, Line 16, after "array" insert -- . --.

In Column 9, Line 33, after "variable" insert -- $H_c$ --.

In the Claims

In Column 18, Line 21, in Claim 1, after "that" delete "that".

In Column 19, Line 47, in Claim 10, after "that" delete "that".

In Column 20, Line 33, in Claim 16, after "list" delete "of items".

In Column 20, Line 66, in Claim 17, after "that" delete "that".

Signed and Sealed this
Second Day of March, 2021

Drew Hirshfeld
*Performing the Functions and Duties of the
Under Secretary of Commerce for Intellectual Property and
Director of the United States Patent and Trademark Office*